(12) United States Patent
Park et al.

(10) Patent No.: US 10,823,455 B2
(45) Date of Patent: Nov. 3, 2020

(54) CONDENSING COMBUSTION APPARATUS

(71) Applicant: KYUNGDONG NAVIEN CO., LTD., Pyeongtaek-si, Gyeonggi-do (KR)

(72) Inventors: Jun Kyu Park, Seoul (KR); Jeong Gi Yu, Seoul (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 147 days.

(21) Appl. No.: 16/060,717

(22) PCT Filed: Nov. 15, 2016

(86) PCT No.: PCT/KR2016/013149
§ 371 (c)(1),
(2) Date: Jun. 8, 2018

(87) PCT Pub. No.: WO2017/099381
PCT Pub. Date: Jun. 15, 2017

(65) Prior Publication Data
US 2018/0363948 A1     Dec. 20, 2018

(30) Foreign Application Priority Data

Dec. 8, 2015 (KR) .................. 10-2015-0174207

(51) Int. Cl.
*F24H 8/00* (2006.01)
*F24H 9/00* (2006.01)
(Continued)

(52) U.S. Cl.
CPC .............. *F24H 8/006* (2013.01); *F24H 1/34* (2013.01); *F24H 1/41* (2013.01); *F24H 9/0031* (2013.01); *F24H 9/128* (2013.01); *F23L 5/02* (2013.01)

(58) Field of Classification Search
CPC ........... F24H 8/006; F24H 1/145; F24H 1/165
See application file for complete search history.

(56) References Cited

U.S. PATENT DOCUMENTS 5,347,980 A * 9/1994 Shellenberger ......... F24H 3/087
126/110 R
6,662,758 B1 * 12/2003 Shin ......................... F24H 8/00
122/18.1
(Continued)

FOREIGN PATENT DOCUMENTS

JP      2006-284041 A     10/2006
JP      2007-93036 A       4/2007
(Continued)

OTHER PUBLICATIONS

International Search Report dated Feb. 13, 2017, issued to International Application No. PCT/KR2016/013149.

*Primary Examiner* — Gregory A Wilson
(74) *Attorney, Agent, or Firm* — Stein IP, LLC (57) ABSTRACT

A condensing combustion apparatus comprising: an upward combustion burner (20); a sensible-heat exchanger (40) which absorbs sensible combustion heat generated by the burner (20); and a latent-heat exchanger (50) which absorbs latent heat of steam included in a combustion gas which has passed the sensible-heat exchanger (40), wherein the sensible-heat exchanger (40) and the latent-heat exchanger (50) have the same lateral widths and are configured as fin-tube heat exchangers having common structures, and wherein a flow path through which the combustion gas, which has passed the sensible-heat exchanger (40), flows upward is formed on one side portion of the latent-heat exchanger (50), a flow path through which the combustion gas, which has passed the one side portion of the latent-heat exchanger (50), flows downward corresponding to a direction in which condensed water falls is formed on a middle portion of the latent-heat exchanger (50), and a flow path through which the combustion gas, which has passed the middle portion of the latent-heat exchanger (50), flows upward and discharges (Continued)

is formed on another side portion of the latent-heat exchanger (50).

9 Claims, 6 Drawing Sheets

(51) Int. Cl.
  *F24H 1/34* (2006.01)
  *F24H 1/41* (2006.01)
  *F24H 9/12* (2006.01)
  *F23L 5/02* (2006.01)

(56) References Cited

U.S. PATENT DOCUMENTS

| | | | |
|---|---|---|---|
| 6,907,846 B2* | 6/2005 | Hur | F24H 1/40 |
| | | | 122/32 |
| 7,458,340 B2* | 12/2008 | Takeda | F24H 1/40 |
| | | | 122/31.1 |
| 8,191,512 B2* | 6/2012 | Park | F23J 15/06 |
| | | | 122/18.1 |
| 10,006,662 B2* | 6/2018 | Haydock | F24H 8/00 |
| 2017/0299274 A1* | 10/2017 | Cho | F28D 7/0075 |

FOREIGN PATENT DOCUMENTS

| | | |
|---|---|---|
| JP | 2014-40950 A | 3/2014 |
| KR | 2003-0029212 A | 4/2003 |
| KR | 10-2009-0067760 A | 6/2009 |
| KR | 10-1389465 B1 | 4/2014 |

* cited by examiner

[FIG. 1]

PRIOR ART

CONDENSING COMBUSTION APPARATUS

CROSS-REFERENCE TO RELATED APPLICATIONS

This application is a national stage of International Application No. PCT/KR2016/013149, filed Nov. 15, 2016, which claims the benefit of priority to Korean Application No. 10-2015-0174207, filed Dec. 8, 2015, in the Korean Intellectual Property Office, the disclosures of which are incorporated herein by reference.

TECHNICAL FIELD

The present invention relates to a condensing combustion apparatus, and more particularly, to a condensing combustion apparatus capable of reducing limitations in an installation space by increasing utilization of a space in the combustion apparatus and decreasing a volume thereof as well as of reducing costs by sharing components of a sensible-heat exchanger and a latent-heat exchanger.

BACKGROUND ART

Generally, combustion apparatuses such as a boiler, a water heater, and the like are apparatuses which heat a heat medium by using combustion heat generated during a combustion process and circulate the heated heat medium along a pipe to use the heat medium for indoor heating or for hot water.

To increase heat efficiency, recently produced combustion apparatuses have been configured to condense combustion apparatuses which include a sensible-heat exchanger which absorbs sensible heat of a combustion gas generated in a combustion chamber and a latent-heat exchanger which absorbs condensed latent heat of steam included in the combustion gas completely heat-exchanged in the sensible-heat exchanger.

Such condensing combustion apparatuses are divided into a downward combustion apparatus and an upward combustion apparatus on the basis of a combustion direction of a burner.

In downward combustion apparatuses, a flow direction of a combustion gas naturally coincides with a direction in which condensed water falls such that latent heat may be maximally recovered. However, it is essentially necessary to use a burner capable of performing downward combustion. As an example of such burners, a premix burner has poor combustion stability and thus a high-priced control system is necessary to implement complicated combustion control.

On the other hand, in upward combustion apparatuses, since there is no limitation in types of burner, combustion stability is high and a relatively low-priced Bunsen burner may be used.

Figure 1:
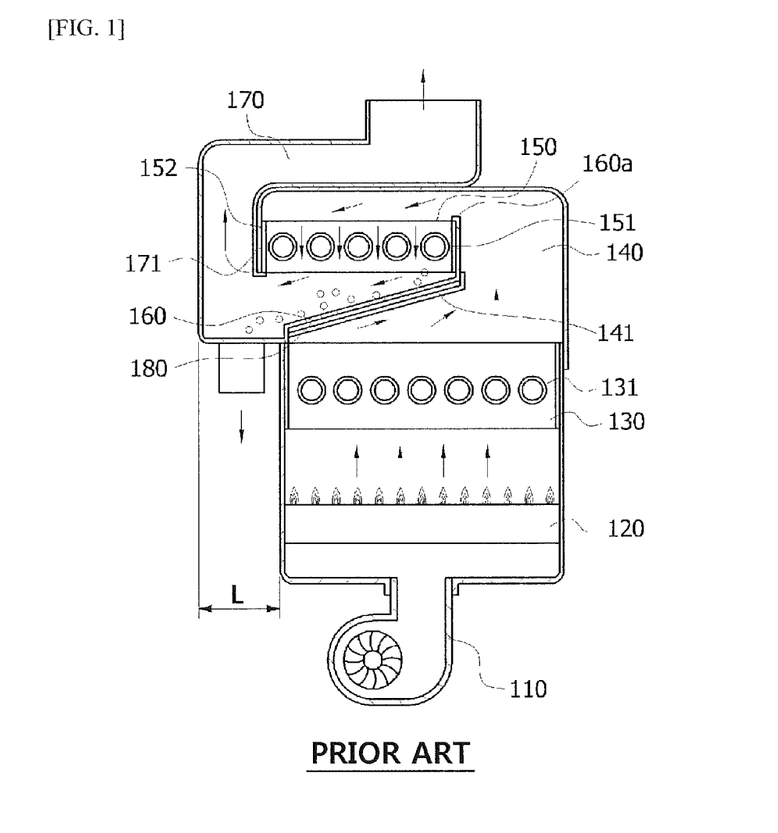
FIG. 1 is a schematic diagram illustrating a structure of a conventional condensing combustion apparatus.

As a prior art related to a conventional condensing combustion apparatus, FIG. 1 illustrates an upward combustion condensing boiler disclosed in Korean Patent Publication No. 10-2009-0067760.

The conventional condensing boiler includes an upward combustion burner 120 installed directly above an air blower 110 to form upward flames, a sensible-heat exchanger 130 which absorbs sensible combustion heat generated by the burner 120, a latent-heat exchanger 150 which absorbs latent heat of steam included in a combustion gas completely heat-exchanged by the sensible-heat exchanger 130, a condensed water collector 160 for discharging condensed water generated by the latent-heat exchanger 150, and an exhaust path 170 through which the combustion gas is discharged.

The sensible-heat exchanger 130 includes heat exchange pipes 131 which are horizontally arranged in parallel and spaced apart, and the latent-heat exchanger 150 includes a plurality of heat exchange pipes 151 horizontally installed and spaced at certain intervals in a body 152 having a box shape with open top and bottom surfaces.

The combustion gas, which has passed through the sensible-heat exchanger 130, passes a gas flow path portion 140 having a narrow flow path and then flows into the latent-heat exchanger 150. A housing 141 included in the gas flow path portion 140 has a shape with a wide bottom and an upwardly narrowing top such that a flow of an exhaust comes to be biased rightward.

The exhaust, which flows upward along an inside of the housing 141, is switched to be leftward at a top end of the housing 141 and then is switched again to be a vertically downward direction to pass through the latent-heat exchanger 150.

According to the above components, a flow direction of the combustion gas coincides with a direction in which the condensed water falls such that latent heat recovery efficiency at the latent-heat exchanger 150 increases and the condensed water is easily discharged.

However, since the conventional condensing combustion apparatus has a configuration for forming a flow path for switching the flow direction of the combustion gas which has passed through the latent-heat exchanger 150 to be upward to face the exhaust path 170 as shown in FIG. 1 and is configured to have a shape in which one side portion of the latent-heat exchanger 150 protrudes outward at a certain length L from one surface of the sensible-heat exchanger 130, a width of a top of the combustion apparatus is formed to be greater than a width of a bottom thereof such that a limitation is present in an installation space for the combustion apparatus.

Also, since the housing disposed above the latent-heat exchanger 150 has a flat shape, the combustion gas, which passes through the gas flow path portion 140 and flows upward, is not uniformly distributed in the whole area of the latent-heat exchanger 150 and flows to be biased to a partial area such that there is a structural limitation in maximizing heat exchange efficiency at the latent-heat exchanger 150.

DISCLOSURE OF INVENTION

Technical Problem

The present invention is directed to providing a condensing combustion apparatus capable of reducing limitations in an installation space and of being easily installed by increasing utilization of a space in the combustion apparatus and decreasing a volume thereof.

The present invention is also directed to providing a condensing combustion apparatus capable of reducing costs and increasing productivity by sharing components of a sensible-heat exchanger and a latent-heat exchanger.

Technical Solution

One aspect of the present invention provides a condensing combustion apparatus (1) including an upward combustion burner (20), a sensible-heat exchanger (40) which absorbs sensible combustion heat generated by the burner (20), and a latent-heat exchanger (50) which absorbs latent heat of steam included in a combustion gas which has passed the sensible-heat exchanger (40). Here, the sensible-heat exchanger (40) and the latent-heat exchanger (50) have the same lateral widths and are configured as fin-tube heat exchangers having common structures. Also, a flow path through which the combustion gas, which has passed the sensible-heat exchanger (40), flows upward is formed on one side portion of the latent-heat exchanger (50), a flow path through which the combustion gas, which has passed the one side portion of the latent-heat exchanger (50), flows downward corresponding to a direction in which condensed water falls is formed on a middle portion of the latent-heat exchanger (50), and a flow path through which the combustion gas, which has passed the middle portion of the latent-heat exchanger (50), flows upward and is discharged, is formed on another side portion of the latent-heat exchanger (50).

Widths of both the side portions of the latent-heat exchanger (50) may be formed to be smaller than a width of the middle portion of the latent-heat exchanger (50). Also, an interval between heat exchange fins arranged on the both side portions of the latent-heat exchanger (50) may be formed to be greater than an interval between heat exchange fins arranged on the middle portion of the latent-heat exchanger (50).

A plurality of flow path caps for switching a flow direction of a heat medium may be provided at both side portions of the sensible-heat exchanger (40) and the latent-heat exchanger (50). Also, lateral widths of the sensible-heat exchanger (40) and the latent-heat exchanger (50) which include the plurality of flow path caps may correspond to a lateral width of a case of a combustion chamber (30) in which the burner (20) is embedded.

A condensed water collector (70) for inducing condensed water to discharge may be provided between the sensible-heat exchanger (40) and the latent-heat exchanger (50). Also, the condensed water collector (70) may be slantly disposed between a top end of the other side of the sensible-heat exchanger (40) and a bottom end of one side of a middle portion of the latent-heat exchanger (50) and may induce the combustion gas, which passes the sensible-heat exchanger (40) and flows upward, to move toward one side portion of the latent-heat exchanger (50).

A vertically upward plate (74), which extends upward and is coupled to a tube (53) of the latent-heat exchanger (50) to prevent a lateral movement of the combustion gas between the middle portion and the one side portion of the latent-heat exchanger (50), may be formed at the condensed water collector (70).

A flow path guide member (80) for inducing the combustion gas, which passes one side portion of the latent-heat exchanger (50) and flows upward, to move toward an area of the middle portion of the latent-heat exchanger (50) may be provided at a top of the latent-heat exchanger (50).

An exhaust path (60) which includes an upper cover (61) and a flue (62) may be provided at the top of the latent-heat exchanger (50). Also, the flow path guide member (80) may include a slant plate (81) slantly disposed between a top end of the other side of the middle portion of the latent-heat exchanger (50) and a bottom surface of the upper cover (61) and a fixing plate (82) integrally formed on the slant plate (81) and coupled to the bottom surface of the upper cover (61).

An upwardly convex flow path switch space may be formed among a top end of the heat exchange fin (55) included in the latent-heat exchanger (50), the upper cover (61), and the flow path guide member (80) to allow the combustion gas, which passes the one side portion of the latent-heat exchanger (50) and flows upward, to be distributed and flow toward the middle portion of the latent-heat exchanger (50).

A vertically downward plate (83), which extends downward and is coupled to a tube (53) of the latent-heat exchanger (50) to prevent a lateral movement of the combustion gas between the middle portion and the other side portion of the latent-heat exchanger (50), may be formed on the slant plate (81).

The fixing plate (82) may be coupled to a perimeter of an outer surface of the flue (62), and a support (82*a*) for fixedly supporting the slant plate (81) may be formed on the fixing plate (82).

The sensible-heat exchanger (40) may be formed of stainless steel (SUS) or copper (Cu), and the latent-heat exchanger (50) may be formed of SUS.

A width of a combustion gas flow path formed on the other side portion of the latent-heat exchanger (50) may be formed to be equal to or smaller than a width of a combustion gas flow path formed on the one side portion of the latent-heat exchanger (50).

Advantageous Effects

According to embodiments of the present invention, while lateral widths of a sensible-heat exchanger and a latent-heat exchanger are formed to have the same size, flow paths for an upward movement of a combustion gas are formed on both side portions of the latent-heat exchanger and a flow path for a downward movement of the combustion gas is formed on a middle portion of the latent-heat exchanger such that a volume of a combustion apparatus may be decreased to reduce a limitation in an installation space and to increase utilization of a space in the combustion apparatus.

Also, the sensible-heat exchanger and the latent-heat exchanger are configured to be fin-tube heat exchangers having common structures such that components may be shared to reduce manufacturing costs of the combustion apparatus and to increase productivity.

Also, a flow direction of the combustion apparatus which passes the latent-heat exchanger and a discharge direction of condensed water coincide with each other to face a vertically downward direction such that latent heat recovery efficiency may be maximized. Here, since the condensed water which falls below the latent-heat exchanger is induced toward a condensed water discharge pipe through a slantly disposed condensed water collector, the condensed water is easily discharged.

Also, the condensed water collector for switching a flow direction of the combustion gas and one end of a flow path guide member are configured to shape-match and be coupled to a tube of the latent-heat exchanger such that the condensed water collector and the flow path guide member may be strongly mounted to increase durability.

Also, while flow paths of the combustion gas are formed on both side portions of the latent-heat exchanger, heat exchange fins are coupled at relatively great intervals to a perimeter of the tube such that flow resistance of the combustion gas may be reduced and the tube may be prevented from being deformed by water pressure of a heat medium.

Also, when a width of a combustion gas flow path formed on the other side portion of the latent-heat exchanger is formed to be smaller than a width of a combustion gas flow path formed on the one side portion of the latent-heat exchanger, a larger area of the middle portion of the latent-heat exchanger may be provided such that heat exchange efficiency of the latent-heat exchanger may be more increased.

<Description of Reference Numerals>

| | |
|---|---|
| 1: Combustion Apparatus | 10: Air Blower |
| 20: Burner | 30: Combustion Chamber |
| 40: Sensible-Heat Exchanger | 41: Heat Medium Inflow Pipe |
| 42: Heat Medium Supply Pipe | 43: Tube |
| 44: Flow Path Cap | 50: Latent-Heat Exchanger |
| 51: Heat Medium Return Pipe | 52: Heat Medium Outflow Pipe |
| 53: Tube | 54: Flow Path Cap |
| 60: Exhaust Path | 61: Upper Cover |
| 62: Flue | 70: Condensed Water Collector |
| 71: Bottom Plate | 72: Front Plate |
| 73: Rear Plate | 74: Vertically upward plate |
| 74a: Tube Coupling Groove | 75: Opening Portion |
| 80: Flow Path Guide Member | 81: Slant Plate |
| 82: Fixing Plate | 82a: Support |
| 83: Vertically Downward Plate | 83a: Tube Coupling Groove |

MODE FOR INVENTION

Hereinafter, components and operations according to an exemplary embodiment of the present invention will be described as follows with reference to the attached drawings.

Referring to FIGS. 2 to 7, a condensing combustion apparatus 1 according to the present invention includes an air blower 10 which supplies air, an upward combustion burner 20 which burns a mixed air of the air and fuel, a combustion chamber 30 in which combustion is performed by flames generated by the burner 20, a sensible-heat exchanger 40 provided above the combustion chamber 30 to absorb sensible combustion heat of a combustion gas generated by the burner 20, a latent-heat exchanger 50 which absorbs latent heat of steam included in the combustion gas which has passed through the sensible-heat exchanger 40, and an exhaust path 60 through which the combustion gas which has passed through the latent-heat exchanger 50 is discharged.

As the burner 20, any one of, a Bunsen burner which supplies minimum primary air necessary for combustion to a nozzle portion and supplies excess secondary air to a part where flames are formed, and a premixed burner which premixes and burns a gas and air, may be used.

The sensible-heat exchanger 40 and the latent-heat exchanger 50 have same lateral widths and are configured as fin-tube heat exchangers having common structures. The sensible-heat exchanger 40 may be formed of stainless steel (SUS) or copper (Cu), and the latent-heat exchanger 50 may be formed of SUS.

Figure 2:
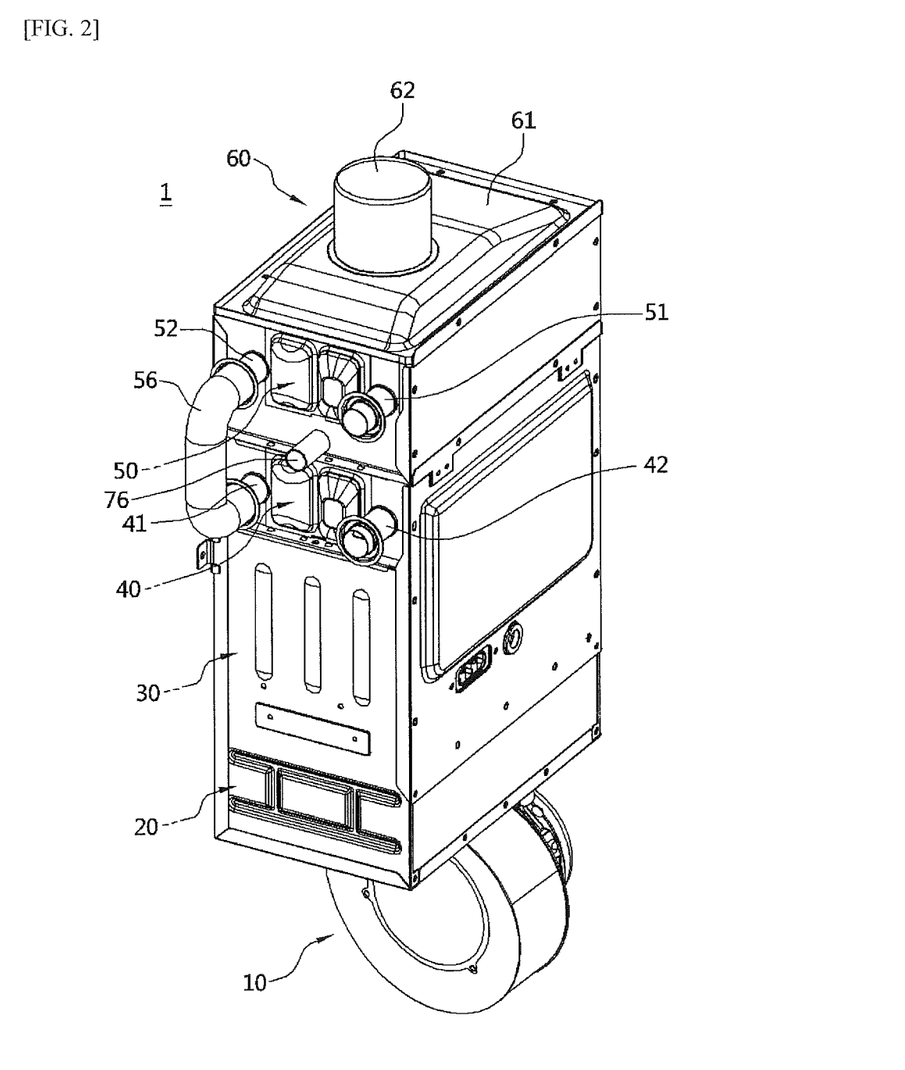
FIG. 2 is a perspective view of a condensing combustion apparatus according to the present invention.
Figure 3:
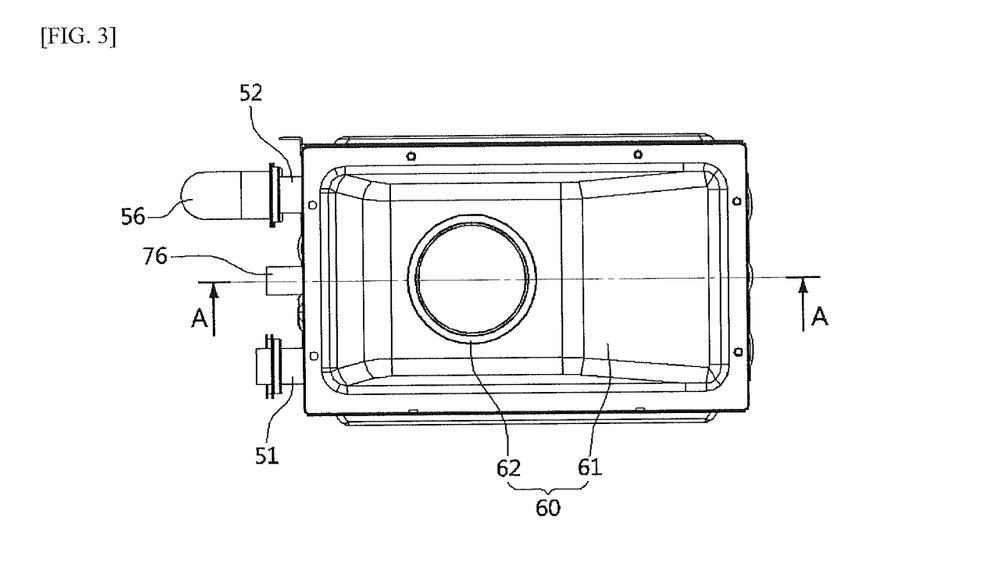
FIG. 3 is a plan view illustrating the condensing combustion apparatus shown in FIG. 2.
Figure 6:
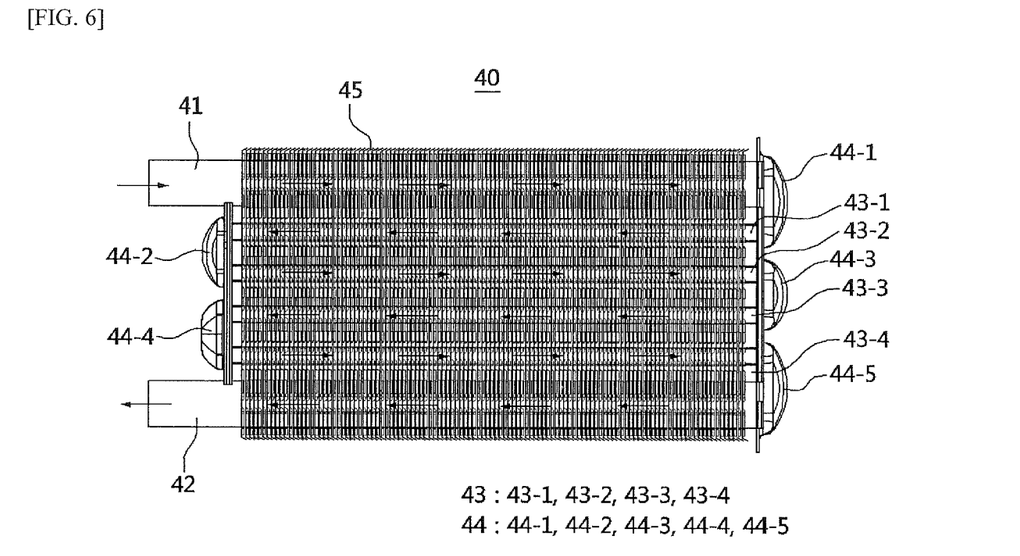
FIG. 6 is a plan view illustrating a sensible-heat exchanger.

Referring to FIGS. 2 and 6, the sensible-heat exchanger 40 includes a heat medium inflow pipe 41 through which a heat medium which has passed through the latent-heat exchanger 50 flows through a connection pipe 56 and a heat medium supply pipe 42 through which the heat medium which has passed the sensible-heat exchanger 40 is supplied to an area requiring heating or an area requiring hot water. A plurality of tubes 43 (43-1, 43-2, 43-3, and 43-4) through which a heat medium flows along inside thereof are arranged and spaced apart at certain intervals frontward and rearward between the heat medium inflow pipe 41 and the heat medium supply pipe 42. A plurality of heat exchange fins 45 are densely arranged and spaced apart from one another leftward and rightward on outer surfaces of the heat medium inflow pipe 41, the plurality of tubes 43, and the heat medium supply pipe 42. Also, a plurality of flow path caps 44 (44-1, 44-2. 44-3, 44-4, and 44-5) for inducing a flow direction of the heat medium, to be switched to be leftward or rightward as indicated by arrows in FIG. 6, are coupled to both sides of the tubes 43.

Figure 7:
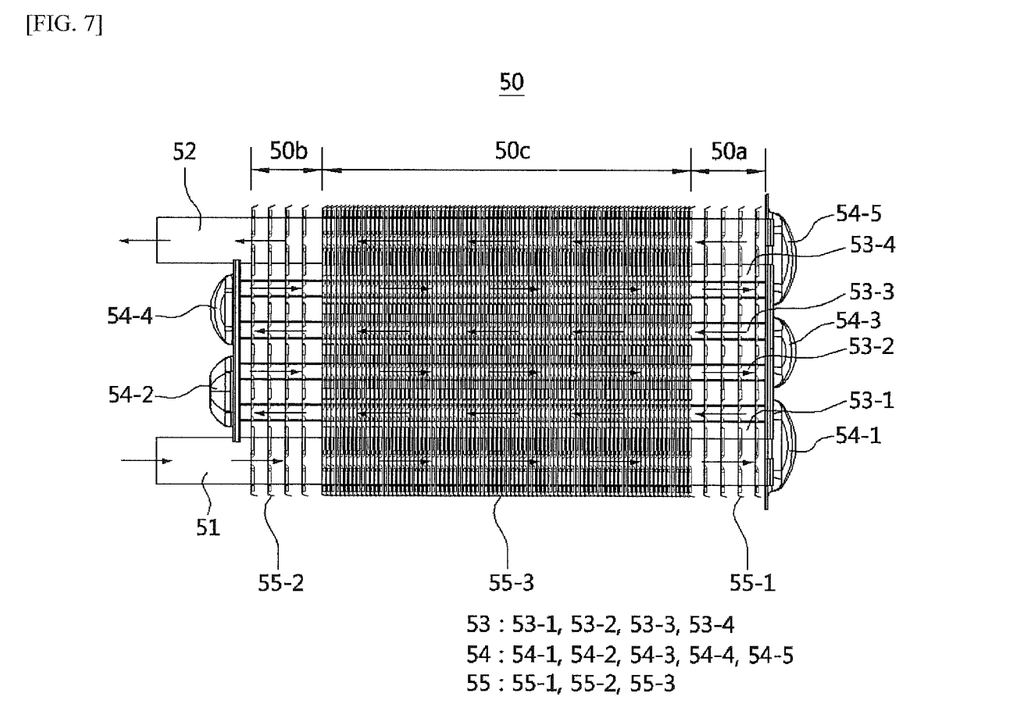
FIG. 7 is a plan view illustrating a latent-heat exchanger.

Referring to FIGS. 2 and 7, the latent-heat exchanger 50 includes a heat medium return pipe 51 through which a heat medium, which has passed the heating-required place or the hot water-required place, returns and a heat medium outflow pipe 52 through which the heat medium which has passed the latent-heat exchanger 50 is discharged toward the sensible-heat exchanger 40 through the connection pipe 56. A plurality of tubes 53 (53-1, 53-2, 53-3, and 53-4) through which the heat medium flows along inside thereof are arranged and spaced apart at certain intervals frontward and rearward between the heat medium return pipe 51 and the heat medium outflow pipe 52. A plurality of heat exchange fins 55 (55-1, 55-2, and 55-3) are arranged and spaced apart from one another leftward and rightward on outer surfaces of the heat medium return pipe 51, the plurality of tubes 53, and the heat medium outflow pipe 52. Also, a plurality of flow path caps 54 (54-1, 54-2. 54-3, 54-4, and 54-5) for inducing a flow direction of the heat medium to be switched to be leftward or rightward as indicated by arrows in FIG. 7, are coupled to both sides of the tubes 53.

The flow direction of the heat medium is configured to be switched to a leftward and rightward direction in the sensible-heat exchanger 40 and the latent-heat exchanger 50 as described above such that a heat transfer area between the heat medium, which flows in the tubes 43 and 53, and a combustion gas is increased to improve heat exchange efficiency.

Also, since the sensible-heat exchanger 40 and the latent-heat exchanger 50 are configured as fin-tube heat exchangers having the common structures, inconvenience caused by separately manufacturing the latent-heat exchanger 50 may be reduced and the latent-heat exchanger 50 may be miniaturized.

Also, lateral widths of the sensible-heat exchanger 40 and the latent-heat exchanger 50 including the plurality of flow path caps 44 and 54 have sizes corresponding to a lateral width of a case of the combustion chamber 30. Accordingly, as shown in FIG. 4, since an overall external shape of the combustion chamber 30, the sensible-heat exchanger 40, and the latent-heat exchanger 50 of the combustion apparatus 1 has a cuboid shape, in comparison to a conventional configuration in which one side of a latent-heat exchanger protrudes at a certain length toward one sides of a combustion chamber and a sensible-heat exchanger, the combustion apparatus 1 may have a decreased entire volume and may have a certain cuboid shape such that a limitation in an installation space of the combustion apparatus 1 may be reduced and utilization of a space in the combustion apparatus 1 may be increased.

Figure 4:
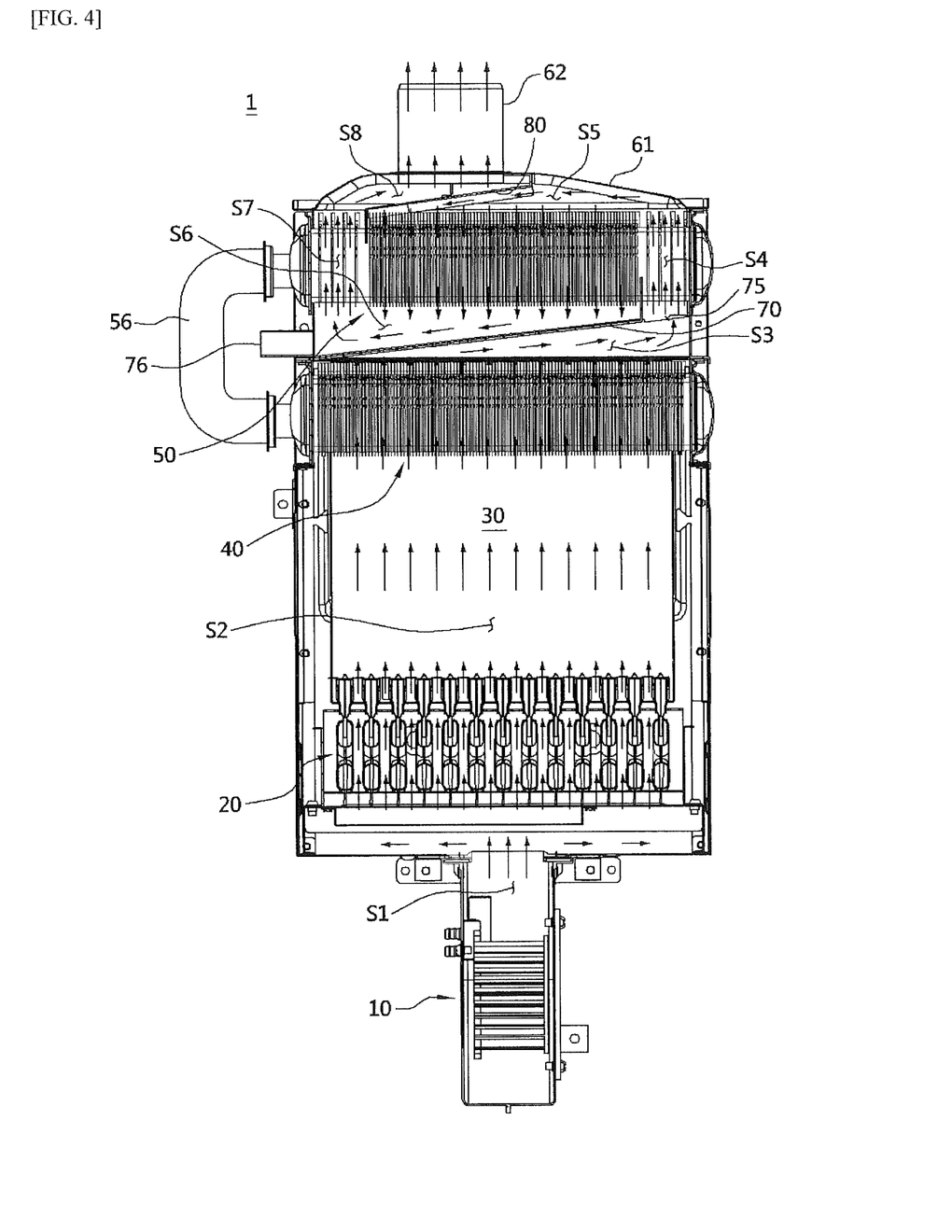
FIG. 4 is a cross-sectional view taken along line A-A in FIG. 3.

Referring to FIGS. 4 and 7, a flow path through which a combustion gas which has passed the sensible-heat exchanger 40 flows upward is formed on one side portion 50a of the latent-heat exchanger 50, a flow path through which the combustion gas which has passed the one side portion 50a of the latent-heat exchanger 50 flows downward corresponding to a falling direction of condensed water is formed on a middle portion 50c of the latent-heat exchanger 50, and a flow path through which the combustion gas which has passed the middle portion 50c of the latent-heat exchanger 50 flows upward and is discharged, is formed on another side portion 50b of the latent-heat exchanger 50.

An arrow in FIG. 4 indicates a flow direction of the combustion gas.

Widths (breadths) of the both side portions 50a and 50b of the latent-heat exchanger 50 are formed to be smaller than a width of the middle portion 50c of the latent-heat exchanger 50, and intervals between heat exchange fins 55-1 and 55-2 arranged on the both side portions 50a and 50b of the latent-heat exchanger 50 are formed to be greater than an interval between heat exchange fins 55-3 arranged on the middle portion 50c of the latent-heat exchanger 50.

The intervals between the heat exchange fins 55-1 and 55-2 provided on the both side portions 50a and 50b of the latent-heat exchanger 50 are formed to be great such that flow resistance of the combustion gas which passes the both side portions 50a and 50b having relatively smaller flow paths and flows upward may be reduced and heat of the combustion gas may be transferred to a heat medium which flows in the tubes 43 and 53 by the heat exchange fins 55-1 and 55-2 to increase heat exchange efficiency.

The tubes 43 and 53 may have a flat oval shape to provide a wide heat exchange area. In this case, the heat exchange fins 55-1 and 55-2 provided on the both side portions 50a and 50b of the heat exchanger 50 support outer surfaces of the tubes 43 and 53 such that the tubes 43 and 53 may be effectively prevented from being deformed by water pressure of a heat medium even in the case of a combustion apparatus such as a water heater in which high water pressure is applied to a heat medium.

Also, a width of a combustion gas flow path S7 formed on the other side portion of the latent-heat exchanger 50 may be equal to or smaller than a width of a combustion gas flow path S4 formed on one side portion of the latent-heat exchanger 50.

Since the combustion gas, which passes the one side portion of the latent-heat exchanger 50, has passed the sensible-heat exchanger 40 and has a high temperature and a large volume, it is necessary to form the flow path S4 to be large. However, since the combustion gas, which passes the other side portion of the latent-heat exchanger 50, decreases in temperature and volume while passing the latent-heat exchanger 50, the flow path S7 receives no flow resistance even when formed to be smaller than the flow path S4.

Accordingly, the width of the combustion gas flow path S7 formed on the other side portion of the latent-heat exchanger 50 may be formed to be smaller than the width of the combustion gas flow path S4 formed on the one side portion of the latent-heat exchanger 50. In this case, an area of the middle portion of the latent-heat exchanger 50 may be provided to be wider such that heat exchange efficiency of the latent-heat exchanger 50 may be more improved.

Figure 5:
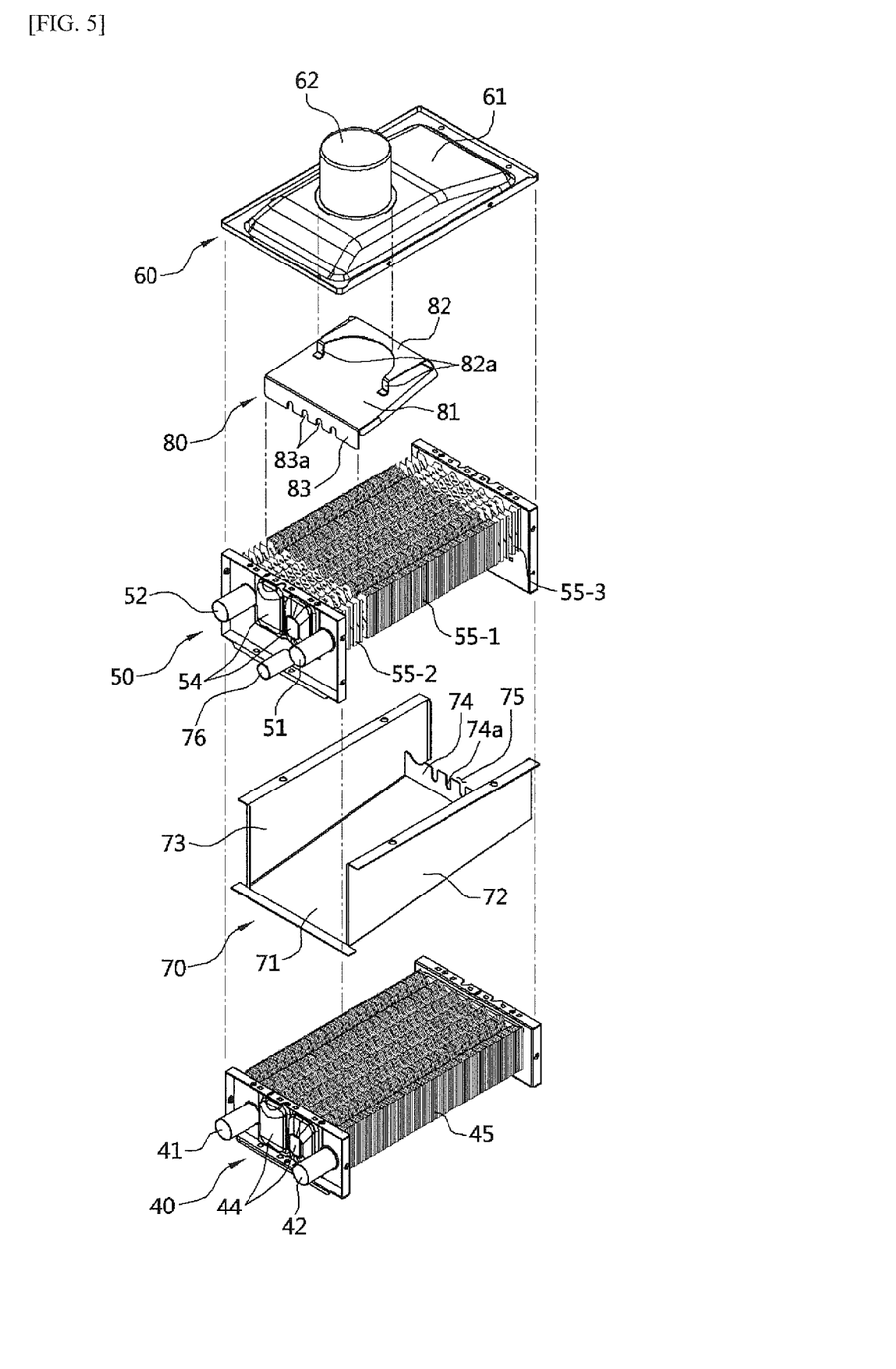
FIG. 5 is an exploded perspective view illustrating main components of the condensing combustion apparatus according to the present invention.

Referring to FIGS. 4 and 5, a condensed water collector 70 for discharging condensed water is provided between the sensible-heat exchanger 40 and the latent-heat exchanger 50.

The condensed water collector 70 includes a bottom plate 71 slantly disposed in an area between a top end of the other side of the sensible-heat exchanger 40 and a bottom end of one side of the middle portion 50c of the latent-heat exchanger 50, a front plate 72 and a rear plate 73, which extend upward from a front end and a rear end of the bottom plate 71 and seal a front side and a rear side of the latent-heat exchanger 50, and a vertically upward plate 74 which extends upward from one end of the bottom plate 71 and is coupled to the tube 53 of the latent-heat exchanger 50 to prevent a lateral movement of a combustion gas between the middle portion 50c and the one side portion 50a of the latent-heat exchanger 50.

The bottom plate 71 of the condensed water collector 70 performs a function of inducing condensed water, which is generated by the latent-heat exchanger 50 and falls, to move toward a condensed water discharge pipe 76 and a function of inducing a combustion gas, which passes the sensible-heat exchanger 40 and flows upward, to move toward the one side portion 50a of the latent-heat exchanger 50.

A tube coupling groove 74a is formed on a top end of the vertically upward plate 74 to shape-match and be coupled to the tube 53 of the latent-heat exchanger 50.

An opening portion 75 is formed on one side of the vertically upward plate 74 to provide a path through which a combustion gas, which flows in a lateral direction toward the one side portion 50a of the latent-heat exchanger 50, flows upward.

Meanwhile, an exhaust path 60 which includes an upper cover 61 and a flue 62 is provided above the latent-heat exchanger 50 and a flow path guide member 80 for inducing the combustion gas, which passes the one side portion 50a of the latent-heat exchanger 50 and flows upward, to move toward an area of the middle portion 50c is provided between the latent-heat exchanger 50 and the upper cover 61.

The flow path guide member 80 includes a slant plate 81 slantly disposed between the top end of the other side of the middle portion 50c of the latent-heat exchanger 50 and a bottom surface of the upper cover 61, a fixing plate 82 integrally formed on the slant plate 81 and coupled to the bottom surface of the upper cover 61, a support 82a which extends from the fixing plate 82 to fixedly support the slant plate 81, and a vertically downward plate 83 which extends downward from the other end of the slant plate 81 and is coupled to the tube 53 of the latent-heat exchanger 50 to prevent a lateral movement of the combustion gas between the middle portion 50c and the other side portion 50b of the latent-heat exchanger 50.

A tube coupling groove 83a is formed on a bottom end of the vertically downward plate 83 to shape-match and be coupled to the tube 53 of the latent-heat exchanger 50.

As described above, the flow path guide member 80 may be fixed to a bottom surface of the upper cover 61 by the fixing plate 82 and the support 82a and simultaneously may be coupled to the tube 53 of the latent-heat exchanger 50 by the vertically downward plate 83 to be strongly supported.

Also, an upwardly convex flow path switch space S5 is formed among a top end of the heat exchange fin 55 included in the latent-heat exchanger 50, the upper cover 61, and the flow path guide member 80. Since the combustion gas which passes the one side portion 50a of the latent-heat exchanger 50 and flows upward may be evenly distributed and flow toward the middle portion 50c of the latent-heat exchanger 50 due to the above configuration, flow resistance of the combustion gas which passes the middle portion 50c of the latent-heat exchanger 50 may be reduced and heat exchange efficiency may be improved.

In a description on a flow path of a combustion gas with reference to FIG. 4, air discharged through an outlet S1 of the air blower 10 is mixed with a gas for combustion and burnt by ignition of the burner 20, and a combustion gas generated by the burner 20 flows upward in a space S2 in the combustion chamber 30, passes the sensible-heat exchanger 40, and transfers sensible combustion heat to a heat medium.

The combustion gas which enters an upper space S3 of the sensible-heat exchanger 50 is induced to one side by the condensed water collector 70, passes a combustion gas flow path S4 between the heat exchange fins 55-1 located on the one side portion 50a of the latent-heat exchanger 50, and flows upward. Also, the combustion gas, which flows to a space S5 between a top end of the latent-heat exchanger 50 and the upper cover 61, is switched in a flow direction by the flow path guide member 80, passes the middle portion 50c of the latent-heat exchanger 50, and flows downward.

The combustion gas, which flows to a lower space S6 of the middle portion 50c of the latent-heat exchanger 50, is induced to the other side by the condensed water collector 70, passes a combustion gas flow path S7 between the heat exchange fins 55-2 located on the other side portion 50b of the latent-heat exchanger 50, and flows upward. The combustion gas, which flows to a space S8 between the top end of the latent-heat exchanger 50 and the upper cover 61 is induced to move toward the flue 62 by the flow path guide member 80 and then is discharged upward.

Since a flow direction of the combustion gas faces a downward direction corresponding to a direction in which condensed water falls in the middle portion 50c of the latent-heat exchanger 50 as described above, a condensation amount of water included in the combustion gas may be increased by minimizing contact between the combustion gas and the condensed water such that latent-heat recovery efficiency may be maximized.

The invention claimed is:

1. A condensing combustion apparatus comprising:
an upward combustion burner (20);
a sensible-heat exchanger (40) which absorbs sensible combustion heat generated by the burner (20); and
a latent-heat exchanger (50) which absorbs latent heat of steam included in a combustion gas which has passed the sensible-heat exchanger (40),
wherein the sensible-heat exchanger (40) and the latent-heat exchanger (50) have the same lateral widths and are configured as fin-tube heat exchangers having common structures, and
wherein a flow path through which the combustion gas, which has passed the sensible-heat exchanger (40), flows upward is formed on one side portion of the latent-heat exchanger (50), a flow path through which the combustion gas, which has passed the one side portion of the latent-heat exchanger (50), flows downward corresponding to a direction in which condensed water falls is formed on a middle portion of the latent-heat exchanger (50), and a flow path through which the combustion gas, which has passed the middle portion of the latent-heat exchanger (50), flows upward and is discharged, is formed on another side portion of the latent-heat exchanger (50),
wherein a plurality of flow path caps for switching a flow direction of a heat medium are provided at both side portions of the sensible-heat exchanger (40) and the latent-heat exchanger (50), and
wherein lateral widths of the sensible-heat exchanger (40) and the latent-heat exchanger (50) which include the plurality of flow path caps correspond to a lateral width of a case of a combustion chamber (30) in which the burner (20) is embedded.

2. The condensing combustion apparatus of claim 1, wherein widths of both the side portions of the latent-heat exchanger (50) are formed to be smaller than a width of the middle portion of the latent-heat exchanger (50), and
wherein an interval between heat exchange fins arranged on the both side portions of the latent-heat exchanger (50) is formed to be greater than an interval between heat exchange fins arranged on the middle portion of the latent-heat exchanger (50).

3. The condensing combustion apparatus of claim 1, wherein the sensible-heat exchanger (40) is formed of stainless steel (SUS) or copper (Cu), and
wherein the latent-heat exchanger (50) is formed of SUS.

4. The condensing combustion apparatus of claim 1, wherein a width of a combustion gas flow path formed on the other side portion of the latent-heat exchanger (50) is formed to be equal to or smaller than a width of a combustion gas flow path formed on the one side portion of the latent-heat exchanger (50).

5. A condensing combustion apparatus comprising:
an upward combustion burner (20);
a sensible-heat exchanger (40) which absorbs sensible combustion heat generated by the burner (20); and
a latent-heat exchanger (50) which absorbs latent heat of steam included in a combustion gas which has passed the sensible-heat exchanger (40),
wherein the sensible-heat exchanger (40) and the latent-heat exchanger (50) have the same lateral widths and are configured as fin-tube heat exchangers having common structures, and
wherein a flow path through which the combustion gas, which has passed the sensible-heat exchanger (40), flows upward is formed on one side portion of the latent-heat exchanger (50), a flow path through which the combustion gas, which has passed the one side portion of the latent-heat exchanger (50), flows downward corresponding to a direction in which condensed water falls is formed on a middle portion of the latent-heat exchanger (50), and a flow path through which the combustion gas, which has passed the middle portion of the latent-heat exchanger (50), flows upward and is discharged, is formed on another side portion of the latent-heat exchanger (50),
wherein a condensed water collector (70) for inducing condensed water to discharge is provided between the sensible-heat exchanger (40) and the latent-heat exchanger (50), and
wherein the condensed water collector (70) is slantly disposed between a top end of the other side of the sensible-heat exchanger (40) and a bottom end of the one side of the latent-heat exchanger (50) and induces the combustion gas, which passes the sensible-heat exchanger (40) and flows upward, to move toward the one side portion of the latent-heat exchanger (50),
wherein a vertically upward plate (74), which extends upward and is coupled to a tube (53) of the latent-heat exchanger (50) to prevent a lateral movement of the combustion gas between the middle portion and the one side portion of the latent-heat exchanger (50), is formed at the condensed water collector (70).

6. A condensing combustion apparatus comprising:

an upward combustion burner (20);

a sensible-heat exchanger (40) which absorbs sensible combustion heat generated by the burner (20); and a latent-heat exchanger (50) which absorbs latent heat of steam included in a combustion gas which has passed the sensible-heat exchanger (40), wherein the sensible-heat exchanger (40) and the latent-heat exchanger (50) have the same lateral widths and are configured as fin-tube heat exchangers having common structures, and wherein a flow path through which the combustion gas, which has passed the sensible-heat exchanger (40), flows upward is formed on one side portion of the latent-heat exchanger (50), a flow path through which the combustion gas, which has passed the one side portion of the latent-heat exchanger (50), flows downward corresponding to a direction in which condensed water falls is formed on a middle portion of the latent-heat exchanger (50), and a flow path through which the combustion gas, which has passed the middle portion of the latent-heat exchanger (50), flows upward and is discharged, is formed on another side portion of the latent-heat exchanger (50), wherein a flow path guide member (80) for inducing the combustion gas, which passes the one side portion of the latent-heat exchanger (50) and flows upward, to move toward an area of the middle portion of the latent-heat exchanger (50) is provided at a top of the latent-heat exchanger (50), an exhaust path (60) which comprises an upper cover (61) and a flue (62) is provided at the top of the latent-heat exchanger (50), and wherein the flow path guide member (80) comprises a slant plate (81) slantly disposed between a top end of the other side of the middle portion of the latent-heat exchanger (50) and a bottom surface of the upper cover (61) and a fixing plate (82) integrally formed on the slant plate (81) and coupled to the bottom surface of the upper cover (61).

7. The condensing combustion apparatus of claim 6, wherein an upwardly convex flow path switch space is formed among a top end of a heat exchange fin (55) included in the latent-heat exchanger (50), the upper cover (61), and the flow path guide member (80) to allow the combustion gas, which passes the one side portion of the latent-heat exchanger (50) and flows upward, to be distributed and flow toward the middle portion of the latent-heat exchanger (50).

8. The condensing combustion apparatus of claim 6, wherein a vertically downward plate (83), which extends downward and is coupled to a tube (53) of the latent-heat exchanger (50) to prevent a lateral movement of the combustion gas between the middle portion and the other side portion of the latent-heat exchanger (50), is formed at the slant plate (81).

9. The condensing combustion apparatus of claim 6, wherein the fixing plate (82) is coupled to a perimeter of an outer surface of the flue (62), and wherein a support (82*a*) for fixedly supporting the slant plate (81) is formed on the fixing plate (82).

\* \* \* \* \*